United States Patent
Dias et al.

(10) Patent No.: US 7,292,961 B2
(45) Date of Patent: Nov. 6, 2007

(54) CAPTURING SESSION ACTIVITY AS IN-MEMORY SNAPSHOTS USING A TIME-BASED SAMPLING TECHNIQUE WITHIN A DATABASE FOR PERFORMANCE TUNING AND PROBLEM DIAGNOSIS

(75) Inventors: Karl Dias, Foster City, CA (US); Venkateshwaran Venkataramani, Foster City, CA (US); Mark Ramacher, San Carlos, CA (US); Graham S. Wood, El Granada, CA (US); Juan Loaiza, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 383 days.

(21) Appl. No.: 10/775,733

(22) Filed: Feb. 9, 2004

(65) Prior Publication Data
US 2005/0055383 A1    Mar. 10, 2005

Related U.S. Application Data

(60) Provisional application No. 60/500,864, filed on Sep. 5, 2003.

(51) Int. Cl.
*G06F 17/40* (2006.01)
(52) U.S. Cl. ............... 702/186; 340/500; 340/679; 700/90; 709/223; 709/224
(58) Field of Classification Search ............ 340/853.2, 340/500, 635, 653, 679, 680, 3.1, 3.43; 700/90, 700/108; 702/127, 178, 182, 183, 184, 185, 702/187, 188, 186; 705/8, 9; 709/223, 224; 714/47
See application file for complete search history.

(56) References Cited

U.S. PATENT DOCUMENTS

| | | | | | |
|---|---|---|---|---|---|
| 2,883,255 | A | * | 4/1959 | Anderson | 346/34 |
| 3,324,458 | A | * | 6/1967 | MacArthur | 714/47 |
| 3,344,408 | A | * | 9/1967 | Singer et al. | 714/47 |
| 3,351,910 | A | * | 11/1967 | Miller et al. | 714/47 |
| 4,654,806 | A | * | 3/1987 | Poyser et al. | 700/292 |
| 4,994,986 | A | * | 2/1991 | Cihiwsky et al. | 358/1.14 |
| 5,349,662 | A | * | 9/1994 | Johnson et al. | 717/127 |
| 5,488,648 | A | * | 1/1996 | Womble | 379/13 |

(Continued)

FOREIGN PATENT DOCUMENTS

JP    55-91036 A    *    7/1980

(Continued)

OTHER PUBLICATIONS

IBM Technical Disclosure Bulletin, "Software Monitor for Performance Tuning a Virtual Memory Computer System", May 1, 1973, vol. No. 15, Issue No. 12, pp. 3730-3733.*

(Continued)

*Primary Examiner*—Edward Cosimano
(74) *Attorney, Agent, or Firm*—Townsend & Townsend & Crew LLP (57) ABSTRACT

Techniques for capturing samples of session activity in a database are provided. Session activity for active sessions is recorded at certain times over a time period. Accordingly, a sample of session activity is taken for sessions in a database.

34 Claims, 6 Drawing Sheets

U.S. PATENT DOCUMENTS

| | | | |
|---|---|---|---|
| 5,729,736 A * | 3/1998 | Gomi et al. | 707/10 |
| 5,781,703 A * | 7/1998 | Desai et al. | 706/50 |
| 5,872,976 A * | 2/1999 | Yee et al. | 717/127 |
| 6,035,306 A | 3/2000 | Lowenthal et al. | |
| 6,311,175 B1 | 10/2001 | Adriaans et al. | |
| 6,615,222 B2 | 9/2003 | Hornibrook | |
| 6,804,627 B1 | 10/2004 | Marokhovsky et al. | |
| 6,954,717 B2 * | 10/2005 | Boldt et al. | 702/187 |
| 6,955,302 B2 * | 10/2005 | Erdman, Jr. | 236/51 |
| 7,085,786 B2 | 8/2006 | Carlson et al. | |
| 7,089,347 B2 | 8/2006 | Mogi et al. | |
| 2002/0065833 A1 | 5/2002 | Litvin | |
| 2004/0044500 A1 * | 3/2004 | Lu | 702/185 |
| 2004/0044700 A1 | 3/2004 | Fisher et al. | |
| 2005/0103874 A1 * | 5/2005 | Erdman, Jr. | 236/51 |
| 2005/0278381 A1 * | 12/2005 | Diao et al. | 707/200 |
| 2007/0022192 A1 * | 1/2007 | Nguyen et al. | 709/224 |

FOREIGN PATENT DOCUMENTS

| | | |
|---|---|---|
| JP | 2-232795 A * | 9/1990 |
| WO | WO 02/06949 A2 * | 1/2002 |
| WO | WO 02/37061 A1 * | 5/2002 |

OTHER PUBLICATIONS

Doppelhammer et al., "Database Performance in the Real World: TPC-D and SAP R/3," 1997, ACM, p. 123-134.

Hagmann et al., "Performance Analysis of Several Back-End Database Architectures," 1986, ACM, p. 1-26.

Ryu et al., "Analysis of Database Performance with Dynamic Locking," 1990, ACM, p. 491-523.

Stonebraker et al., "Performance Enhancements to a Relational Database Systems," 1983, ACM, p. 167-185.

* cited by examiner

CAPTURING SESSION ACTIVITY AS IN-MEMORY SNAPSHOTS USING A TIME-BASED SAMPLING TECHNIQUE WITHIN A DATABASE FOR PERFORMANCE TUNING AND PROBLEM DIAGNOSIS

CROSS-REFERENCES TO RELATED APPLICATIONS

This application is a non-provisional application of and claims benefit to U.S. Provisional Application No. 60/500,864, filed Sep. 5, 2003, now expired, which is incorporated by reference in its entirety for all purposes.

The present application incorporates by reference for all purposes the entire contents of the following:

U.S. application Ser. No. 10/775,531, filed on Feb. 9, 2004 and entitled "AUTOMATIC DATABASE DIAGNOSTIC MONITOR ARCHITECTURE"; and U.S. application Ser. No. 10/755,513, filed on Feb. 9, 2004 and entitled "THE TIME MODEL".

BACKGROUND OF THE INVENTION

The present invention generally relates to databases and more specifically to apparatus and methods for capturing samples of session activity in a database.

Enterprise databases continue to grow in size and number resulting in increased systems management and administrative complexity. As the size and complexity of database systems increase, the likelihood that performance problems may result also increases. Analysis of the problems thus becomes an important task to properly maintain database systems.

As users connect to a database to request operations, sessions are assigned to the users. A database system may include many sessions that are performing operations in the system at any given time. A session activity log is useful in diagnosing any performance problems. The log typically includes full traces of all activity performed by a session. Capturing the log, however, is very expensive and prohibitively slows a database system down.

Also, because many sessions may be present in a database system over a period of time, it may not be feasible to capture a full trace of activity for all sessions in a database system. In some cases, capturing information may be considered too prohibitive and no information is collected. The activity may be captured using requests externally from the database system, such as SQL requests. This method is again costly and the information returned may not be reliable because the activity that may be causing the performance problem may not be recorded. In other cases, information for only a select number of sessions may be captured. Thus, when analyzing performance problems, a user may not have enough information on session activity to properly diagnose a performance problem.

Accordingly, methods and apparatus for efficiently capturing information for session activity in a database are needed.

BRIEF SUMMARY OF THE INVENTION

Embodiments of the present invention generally relate to capturing snapshots of session activity in a database. In one embodiment, session activity for active sessions is recorded at certain times over a time period. Accordingly, a sample of session activity is taken for sessions in a database.

In one embodiment, a method for capturing information for activity in a database is provided. The database includes one or more sessions that may or may not be active over a period of time. The method comprises: determining a plurality of times to sample the database; at each of the each plurality of times, performing the steps of: determining one or more active sessions from the one or more sessions included in the database that are active at the time; capturing information for each of the one or more active sessions; and storing the captured information for each of the active sessions.

In another embodiment, an apparatus for sampling database activity is provided. The database including one or more sessions that may or may not be active over a period of time. The method comprises: a session activity determiner configured to determine one or more active sessions of one or more sessions in the database at certain times over a time interval, wherein the one or more sessions may or may not be active over a period of time; and an activity sampler configured to capture samples of activity for active sessions at the certain times, wherein the samples are captured by recording a sequence of snapshots of information for one or more active sessions over time.

In yet another embodiment, a method for capturing session activity in a database is provided. The database including one or more sessions that may or may not be active over a period of time. The method comprises: determining one or more active sessions from the one or more sessions in the database at certain times over a time interval; and capturing samples of activity for active sessions at the certain times, wherein the samples are captured by recording a sequence of snapshots of information for one or more active sessions over time.

Embodiments of the present invention may be included in a computer program product stored on a computer-readable medium.

A further understanding of the nature and advantages of the invention herein may be realized by reference of the remaining portions in the specifications and the attached drawings.

DETAILED DESCRIPTION OF THE INVENTION

Overview

Figure 1:
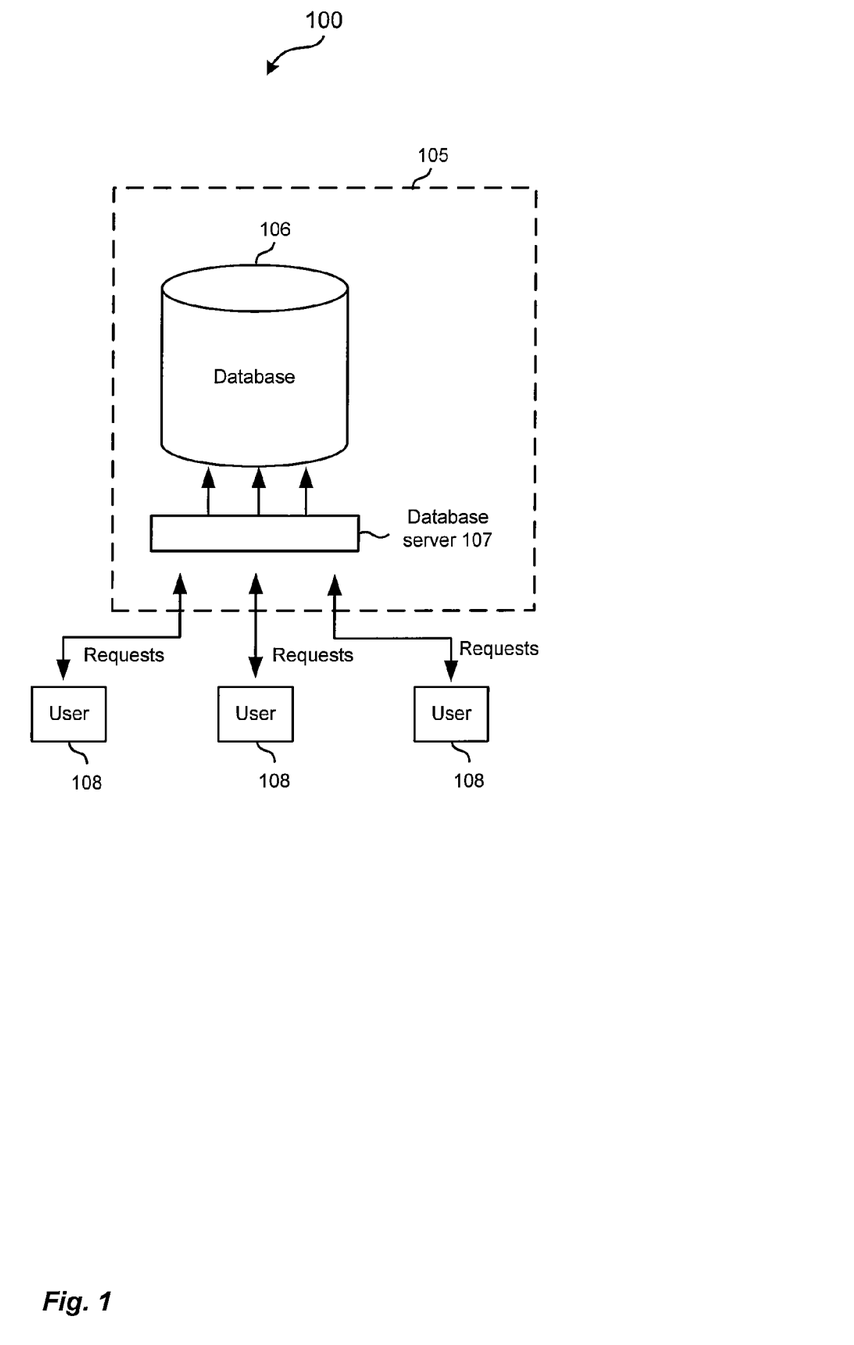
FIG. 1 depicts a system for diagnosing performance problems in a database system according to one embodiment of the present invention.

FIG. 1 depicts a system 100 for using a database system according to one embodiment of the present invention. System 100 includes a client, a database system 105, and one or more users 108.

Figure 6:
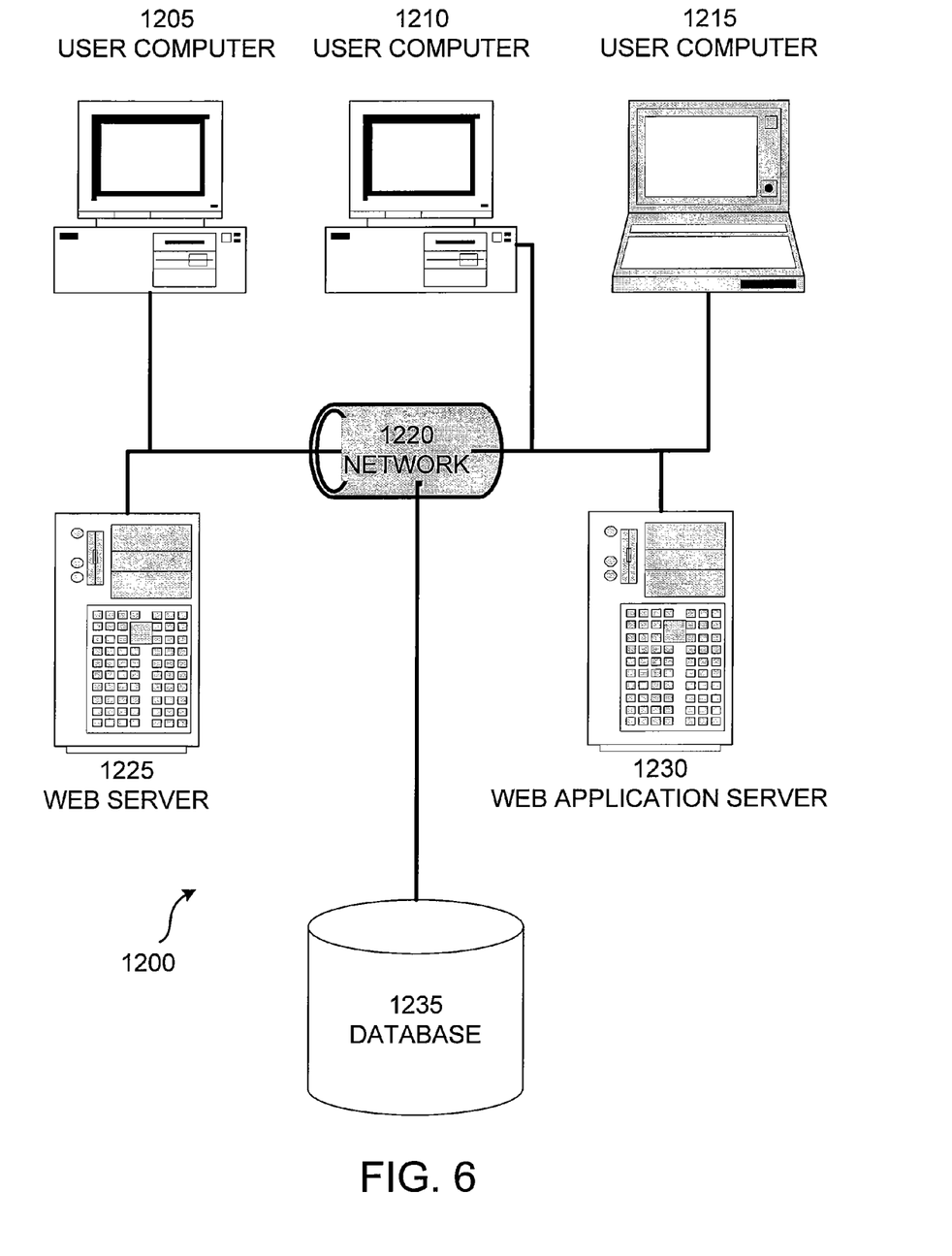
FIG. 6 is a block diagram of a database system for implementing an embodiment of the invention.

In one embodiment, database system 105 includes a database 106 and database server 107. Database server 107 is configured to receive and process requests for database 106. Database system 105 may be any database system and a person skilled in the art will appreciate other components and variations to database system 105. FIG. 6 provides a general description of a database system.

Users 108 send requests for operations to be performed in database 106. The operations include reading data in database 106, writing data to database 106, updating data in database 106, etc. For example, the requests include SQL statements that cause operations to be performed in database 106. The interaction of the users 108 with database 106 using requests is known in the art and a person of skill in the art will appreciate how database systems may be used.

In one embodiment, an automatic database diagnostic monitor (ADDM) may use information captured by embodiments of the present invention. ADDM is described in more detail in the application entitled "AUTOMATIC DATABASE DIAGNOSTIC MONITOR ARCHITECTURE", U.S. application Ser. No. 10/775,513, filed Feb. 9, 2004; and the application entitled "THE TIME MODEL", U.S. application Ser. No. 10/775,513, filed Feb. 9, 2004, the contents of which are incorporated herein for all purposes. In one embodiment, ADDM uses the information captured to diagnose performance problems in database system 105.

In addition to ADDM, embodiments of the present invention may be used by other systems. For example, other database systems, application servers, Internet applications, and any other systems that that require information on session activity may be used.

Capturing Information for Database Activity

Figure 2:
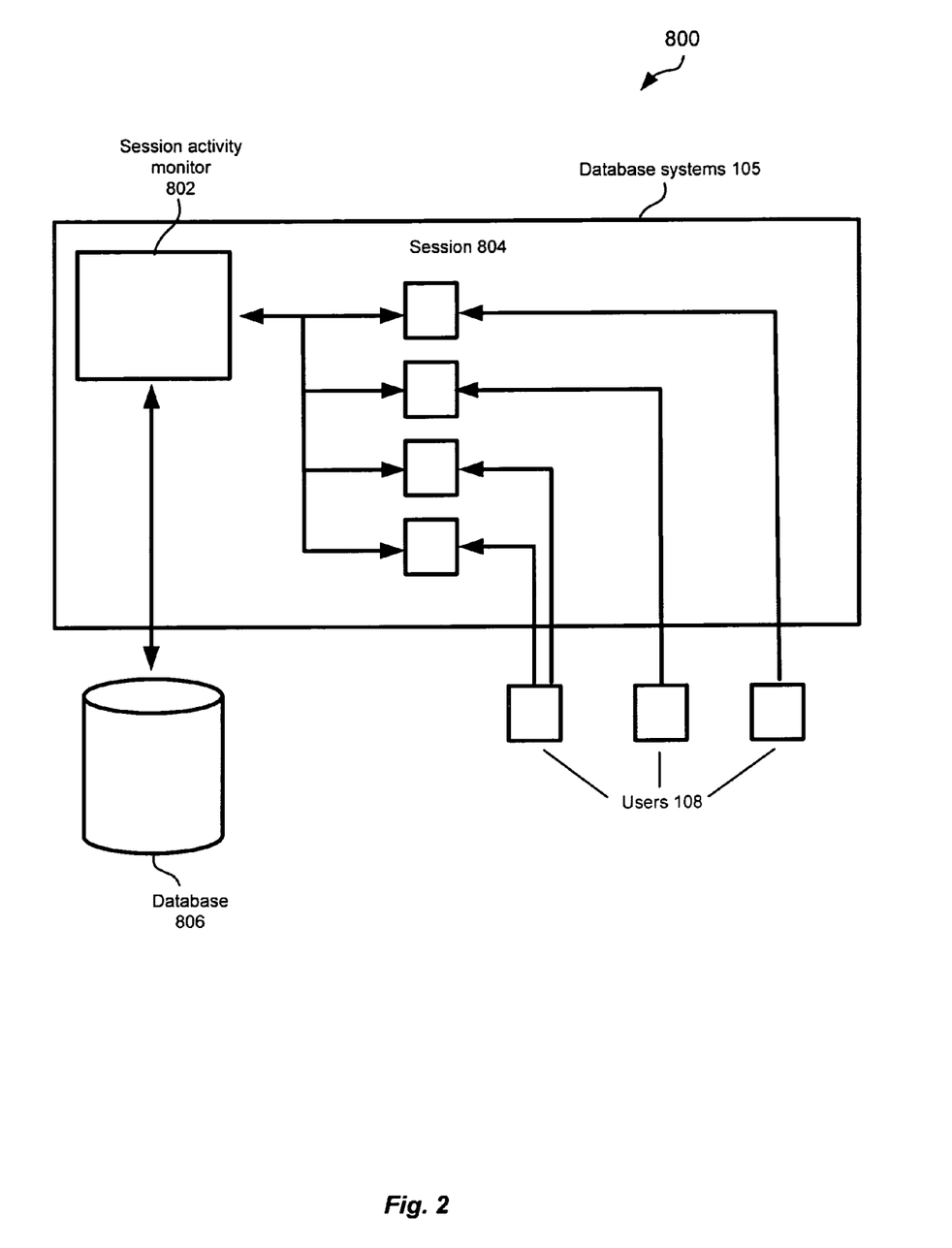
FIG. 2 depicts a system for sampling activity in the database system according to one embodiment of the present invention.

FIG. 2 depicts a system 800 for sampling activity in database system 105 according to one embodiment of the present invention. System 800 includes a session activity monitor (SAM) 802, one or more sessions 804, users 108, and a database 806.

SAM 802 is configured to capture information about sessions 804. In one embodiment, SAM 802 captures information without using a query language, such as structured query language (SQL). In one embodiment, SAM 802 is located such that access to information for sessions 804 may be captured internally in database system 105. For example, SAM 802 may be located in database system 105. More specifically, SAM 802 may be located in database server 107 such that database server 107 is effectively capturing information itself. Thus, queries for information are not necessary and may be captured from internal data structures in database system 105.

Users 108 connect to database system 105. Once connected, a session 804 is generated. Users 108 may then send requests that are processed by database system 105. The requests and any information associated with operations performed for the requests are associated with the assigned session 804. Accordingly, a session 804 may be any entity that is associated with operations being performed in database system 105. Also, a session 804 may be associated with a user 108 (e.g., a user identifier).

Sessions 804 may be, over time, active or inactive. For example, in performing an operation, session 804 may be performing some type of act in database system 105, such as retrieving data. An operation may include many database calls, which are units of work within database system 105. For example, in performing an operation, such as a SQL statement, the operation may include various phases, such as parsing, executing; fetching results, that translate to database calls. A session may be inactive between database calls, such as data for the phase may not be available yet. A session may also be inactive between operations as a user sees it. For example, the time between when a request ends and a request is received is when a session is inactive as a user sees it. The total time spent in database calls is referred to as "database time or db time". The time between operation is called "response time" and this is the time the user waits. The key difference between the two is the time spent on the network. Eventually, the operation may be completed. When the operation has been completed, additional operations may be performed for session 804 or the session may end.

Different information may be associated with a session 804. The information may include state information that provides the state of the request at the time. For example, the information includes information describing who a user 108 that requested the operation is (e.g., a user ID), what request (e.g., SQL command) is being processed, what the operation is doing (e.g., waiting, retrieving data, updating data, etc.), and other information. This information is useful when a performance problem is encountered and may be used to diagnose the problem. For example, certain requests and their activity may be viewed, how much time was spent on certain operations can be estimated, etc. and may be used in diagnosing a performance problem. This data may also be used to reconstruct the set of operations/activity in database system 105 for the time under consideration, etc. may be used in diagnosing a performance problem.

SAM 802 is configured to take snapshots of activity for sessions. In one embodiment, snapshots are combined into a sample. The sample does not include all activity for a session 804. Accordingly, a full trace of information is not taken in one embodiment.

SAM 802 is configured to capture information from sessions 804 at certain times during a time interval. For example, a time interval, such as every second, may be used for capturing information. At every interval, SAM 802 captures information from sessions 804. Thus, a snapshot of information is captured at certain times rather than a full trace of activity. A sequence of snapshots may be referred to as a sample of the session history. A set of samples do not include all information but may be sufficient to determine the activity for sessions and the database as a whole. For example, if an operation is performing an action for three seconds, a snapshot at every second will capture information for the action. When a new action is started, the next snapshot captures information about the new action. Thus, what a session 804 is doing over a period of time may be determined even though a full trace of information is not recorded. Consumers of the captured information may determine that the information is statistically significant by using well known statistical analysis before drawing conclusions.

In one embodiment, when SAM 802 determines it is time to capture information, information is captured for active sessions and not inactive sessions. By capturing information for all active sessions at certain time intervals, SAM 802 is able to capture information that may be best for diagnosing performance problems. The burden of capturing information for all sessions 804 that are active is lessened because information is captured at certain intervals. This allows information for all active sessions 804 to be recorded. Also, the burden of capturing information is lessened because information for inactive sessions is not captured. Thus, the captured information may be manageable in that the size captured is smaller and the time taken to capture the information is shorter.

The information captured may be temporarily stored in memory and then archived in database 806, or the information may be directly stored in database 806. The captured information, whether in temporary memory or on disk, is used in diagnosing problems, etc. Also, the captured information may be selectively filtered where information that is deemed important is stored in database 806.

Figure 3:
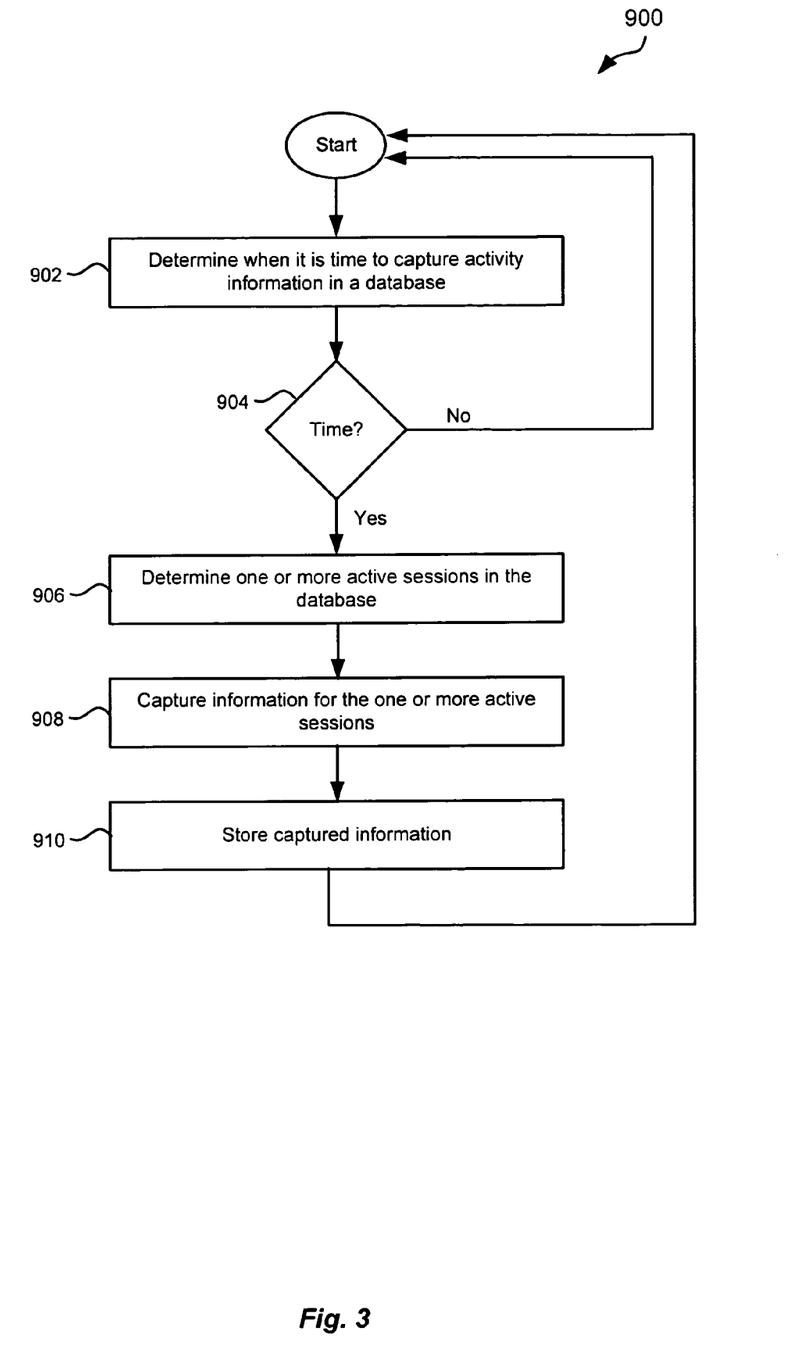
FIG. 3 depicts a simplified flowchart of a method for capturing information for session histories according to one embodiment of the present invention.

FIG. 3 depicts a simplified flowchart 900 of a method for capturing information for session histories according to one embodiment of the present invention. In step 902, SAM 802 determines when it is time to capture activity information in database system 105. In one embodiment, a time interval is determined where information is captured periodically. For example, SAM 802 may capture information every second. Accordingly, a full trace of information is not captured in one embodiment. Rather, a sample of activity is captured where information is captured at certain time intervals.

In step 904, if it is not time to capture information, the method reiterates to step 902. If it is time, the method proceeds to step 906, where one or more active sessions in database system 105 are determined. In one embodiment, information from active sessions and not inactive sessions is captured. An active session is a session that is actively performing an operation at the time. For example, an active session may be performing a database call or a thread in database server 105 may be executing an operation. An inactive session is a session that is not doing work. For example, an inactive session may be in between database calls or waiting for a resource.

In one embodiment, a flag is set that indicates that a session 804 is active. SAM 802 then captures information for all active sessions 804. In one embodiment, a flag is set that indicates that a session 804 is active.

Although it is described that only information from active sessions are captured, it will be understood that information from inactive sessions may be captured. For example, if the number of sessions present in database system 105 is low, then information may be captured from the inactive sessions. In other embodiments, information is captured for just the active sessions. Because information is captured for active sessions, it may not be prohibitive to capture information for all sessions 804 if database system 105 has a lot of sessions 804. Also, typically, when diagnosing a problem, activity for a session 804 is reviewed to determine the problem. Time when a session 804 is inactive may be reviewed also, but the inactive time may be determined from the sequence of captured information. For example, ten snapshots of information may yield information for a session 804 at snapshot one and ten. The session may have been inactive for the time between the first and tenth snapshots and this may be determined by there not being any information for that session 804 in snapshots 2-9.

In one embodiment, ADDM uses statistical techniques to ensure that the active session samples are statistically significant (from the captured information). For example, monitoring device determines a performance problem. The performance problem indicates which operations may be causing problems. Then, monitoring device looks at the individual requests that were made by users 108 that caused the problem. In order to do this, the samples of active session history are analyzed. The information in different snapshots for an operation are reviewed and a model of what was recorded is developed. The model is useful in determining what a request did in database server 107 (e.g., what operations were performed). If information captured is relatively unintrusive to the operation of database system 105, then snapshots of active sessions may be taken at continuous uniform intervals. The snapshots may provide a statistically significant picture of activity in database system 105. Then, ADDM may use techniques to analyze the activity to determine which operations may be causing performance problems.

In step 908, information is captured from the one or more active sessions determined in step 906. In one embodiment, internal data structures are scanned to determine what activity an active session is performing at the time. SAM 802 is then configured to capture the information from the internal data structures without using SQL in one embodiment. The internal data structures may be found in database server 107 and/or database 106. The data structures are read and information is captured.

In step 910, the captured information is stored. In one embodiment, the captured information may first be stored in temporary storage (e.g., memory). The most recent captured information may be stored in temporary storage for easier and faster access. An advantage of this is that the most recent information may be used more often in diagnosing performance problems. The information stored in temporary storage may also be archived in database 806. This information may be used in future analysis or for analysis over a greater period of time.

The method then reiterates to step 902 where another snapshot of information is captured. Accordingly, a sequence of snapshots is captured over time. The sequence of information may be very useful in diagnosing a performance problem. Although it is not a full trace of information, the snapshots may provide a representation of activity in the database that may be just as useful as the full trace. If the activity of a session is known for a periodic interval over a time period, the sequence of information may be pieced together in a statistically significant manner to determine what activity took place. The information may then be used to diagnose a performance problem. Thus, the problem may be diagnosed without burdening database system 105 with requests for full traces of all activity. Also, information is captured for all active sessions rather than only a select few. A log of information for all active sessions is thus recorded.

Figure 4:
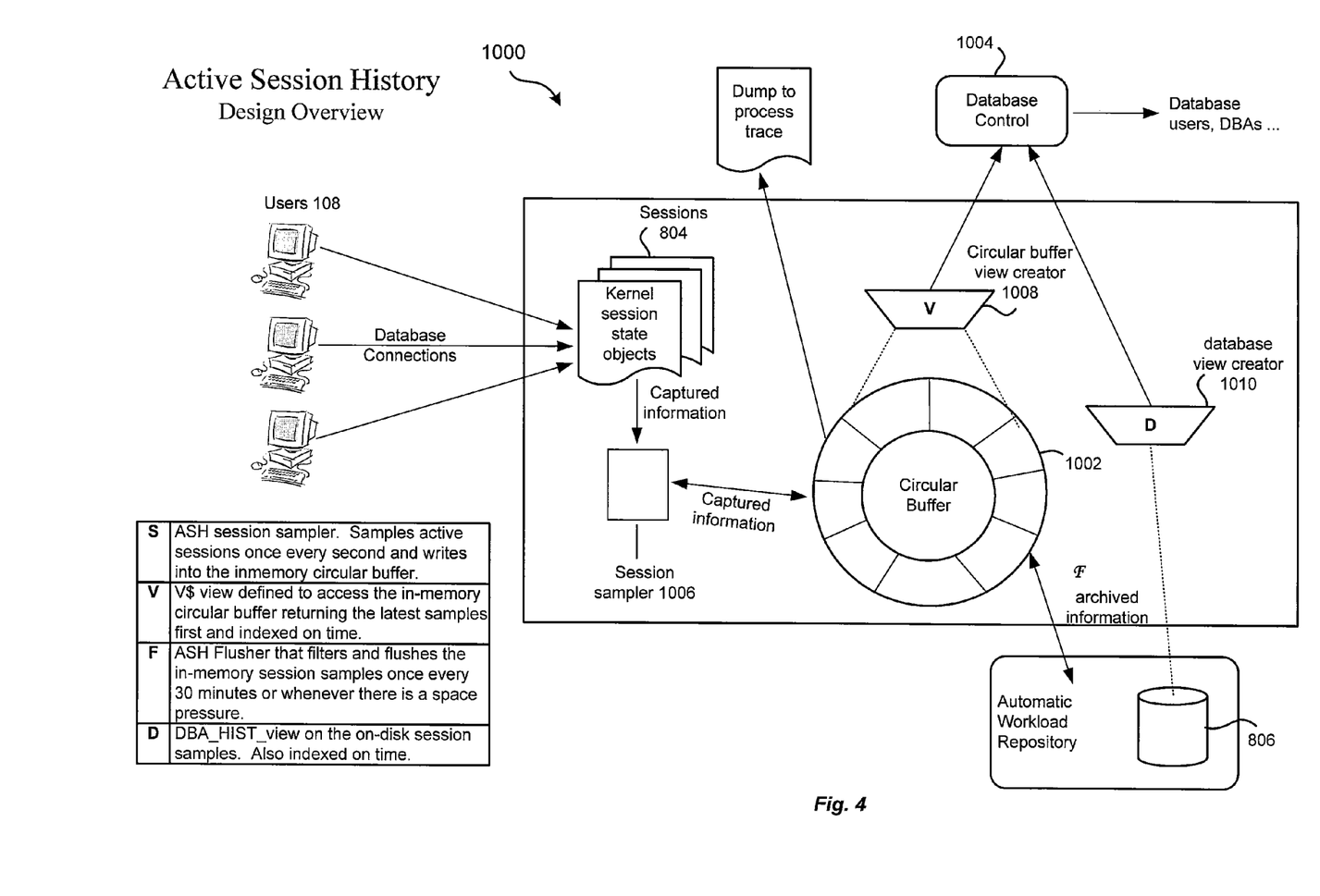
FIG. 4 depicts a more detailed block diagram of a system implementing an embodiment of the present invention.

FIG. 4 depicts a more detailed block diagram of a system 1000 implementing an embodiment of the present invention. System 1000 depicts the data flow for data captured by SAM 802. SAM 802 includes modules, such as session sampler 1006, circular buffer view creator 1008, and database view creator 1010, that may be implemented in software, hardware, or any combination thereof. Users 108 connect to database system 105. Sessions 804 are created and represented by state objects. The state objects include information about the activity for sessions 804.

Session sampler 1006 captures information from active sessions in sessions 804. The information is written to a circular buffer 1002. Circular buffer 1002 may temporarily store the captured information. It will be understood that a person of skill in the art will appreciate other storage devices in which information may be written.

Circular buffer 1002 is configured where recent information may be more easily accessible than older information. The recent information may be more likely to be accessed and may be accessed faster than information in database

806. As information for active sessions is captured periodically, it is written to an entry in circular buffer 1002. The information may be written where the oldest information may be flushed from circular buffer 1002. The oldest information in an entry may be deleted or archived to database 806. The filtering process will be discussed in more detail below. In another embodiment, the information in circular buffer 1002 may be flushed periodically (e.g., every 30 seconds) or when there is space pressure (e.g., buffer 1002 is reaching capacity). In this case, entries are not overwritten, rather information is flushed before any entry needs to be overwritten.

A database control 1004 is an interface that may be used to access captured information. In one embodiment, circular buffer view creator 1008 may create a view "V" using information in circular buffer 1002. Also, database view creator may create a view "D" from information from database 806. The information from view "V" and view "D" may be combined to form a complete view. The complete view may then be used to diagnose performance problems or used for other reasons. The views may be created by time, user 108 or session 804.

In one embodiment, the captured information is retrieved from circular buffer 1002 and database 806 by references one or more times. For example, captured information may be stored and indexed by time. Information may then be retrieved for a certain time period. Also, information may be further indexed by user 108 (e.g., which user is associated with a session 804 for which information is stored), by operation performed, etc.

Figure 5:
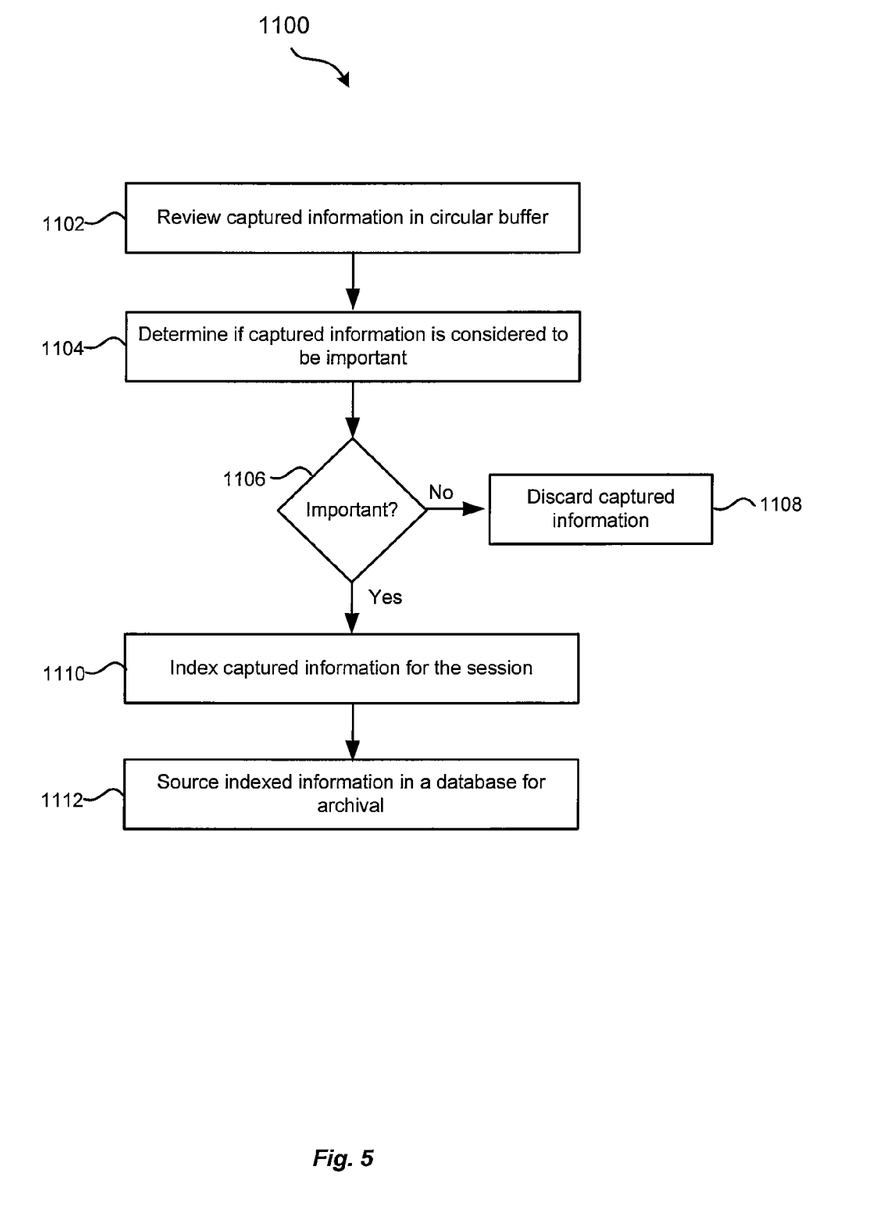
FIG. 5 depicts a simplified flow chart of a method for filtering captured information according to one embodiment of the present invention.

FIG. 5 depicts a simplified flow chart 1100 of a method for filtering captured information according to one embodiment of the present invention. In step 1102, captured information in circular buffer 1002 is reviewed. In one embodiment, the information is filtered on a user by user basis. For example, the information captured is associated with a session 804 and thus a user 108. The information for each session 804 is analyzed to determine if it should be deleted or stored. In another embodiment, the information captured for all active sessions is analyzed as a whole.

In step 1104, it is determined if the information selected in step 1102 is considered important. In one embodiment, different criteria are used to determine if the information is important and should be saved in database 806.

In another embodiment, time based filtering may be used. For example, the captured information at certain times is saved, such as one out of every three snapshots of information in circular buffer 1002 is saved.

In step 1106, if the captured information is not important, then in step 1108, the information is discarded. If the captured information is important, the information is indexed in step 1110.

In one embodiment, the information is indexed based on the time the information was captured. Thus, if any performance problems are detected, information may be retrieved when the problem occurred. The information may also be indexed by user 108 or session 804. For example, the index may be a user ID for information that was captured about a request a user 108 made. Also, the session 804 that was created for a user 108 may be used as an index. Information specific to users 108 and sessions 804 may then be retrieved. User and session-specific problems may then be diagnosed using this information.

In step 1112, the indexed information is stored in database 806. The information may be archived for retrieval at a later time. In one embodiment, one difference between information in circular buffer 1002 and database 806 is information in circular buffer 1002 may be accessed faster.

In one embodiment, information for a session 804 may not be available at a time information is captured. For example, an operation may be in progress for session 804 and still need to finish. A practical example is a surveillance camera taking pictures of a customer in a store. The camera may take a picture of a customer browsing products but that picture does not have the information that may be needed (e.g., whether the product was purchased). In this case, SAM 802 remembers which sessions 804 need information. Once the activity is finished, the previously stored captured information is updated with the new information. Accordingly, the prior snapshot of information includes the in progress activity and the final activity.

Accordingly, a sample of information is looking to a future event that may occur. Information when the event occurs or time that it took to complete is then captured when the event happens. A sample is then completed with the information. This is important because taking snapshots for a sample of database activity means that samples are in progress a lot. Thus, having a mechanism to determine what information is needed to add to a sample is important. The information about the completed operation or the time it took to complete is used in certain analysis of performance problems. In one embodiment, external queries, such as from users 108, cannot perform a data fixup if they are querying database system 105 for information.

Embodiments of the present invention provide many advantages. For example, the capturing of information at certain intervals decreases the times information is captured but increases the amount of information that can be captured. Because information is captured less frequently than for a full trace, information for all active sessions may be captured. The complete information for all active sessions that is captured at each time interval may be used to better diagnose performance problems.

The capturing of information at certain time intervals is more efficient in terms of CPU efficiency, impact on other database processes, and the total time taken to capture information for session activity. Also, the information is captured without using SQL queries thereby reducing database activity. Because information is captured at a database level without querying the database, information that cannot be captured outside the database (i.e., by users or applications querying the database) may be captured.

By having different granularities of snapshots in memory and secondary storage, analysis may be quickly done with more recent data and a more in-depth analysis done with information in the secondary storage.

Although embodiments of the present invention were described with reference to a database system 105, it will be understood that the embodiments are not limited to databases. For example, embodiments may be used in communications systems that are performing operations, Internet applications servers, etc. In one embodiment, any system that includes sessions may use embodiments of the present invention.

FIG. 6 is a block diagram of a system 1200 for implementing an embodiment of the invention. System 1200 includes user computers 1205, 1210, and 1215. User computers 1205, 1210, and 1215 can be general purpose personal computers having web browser applications. Alternatively, user computers 1205, 1210, and 1215 can be any other electronic device, such as a thin-client computer, Internet-enabled mobile telephone, or personal digital assistant, capable of displaying and navigating web pages or other types of electronic documents. Although system 1200 is shown with three user computers, any number of user computers can be supported.

A web server 1225 is used to process requests for web pages or other electronic documents from user computers 1205, 1210, and 1215. In an embodiment of the invention, the data analysis software operates within a web browser on a user computer. In this embodiment, all user interaction with the data analysis software is via web pages sent to user computers via the web server 1225.

Web application server 1230 operates the data analysis software. In an embodiment, the web application server 1230 is one or more general purpose computers capable of executing programs or scripts in response to the user computers 1205, 1210 and 1215. The web application can be implemented as one or more scripts or programs written in any programming language, such as Java™, C, or C++, or any scripting language, such as Perl, Python, or TCL.

In an embodiment, the web application server 1230 dynamically creates web pages for displaying the data analysis software. The web pages created by the web application server 1230 are forwarded to the user computers via web server 1225. Similarly, web server 1225 receives web page requests and input data from the user computers 1205, 1210 and 1215, and forwards the web page requests and input data to web application server 1230.

The data analysis application on web application server 1230 processes input data and user computer requests and can be stored or retrieved data from database 1235. Database 1235 stores data created and used by the enterprise. In an embodiment, the database 1235 is a relational database, such as Oracle 9i, that is adapted to store, update, and retrieve data in response to SQL format commands.

An electronic communication network 1220 enables communication between computers 1205, 1210, and 1215, web server 1225, web application server 1230, and database 1235. In an embodiment, network 1220 may further include any form of electrical or optical communication devices, including wireless and wired networks. Network 1220 may also incorporate one or more local-area networks, such as an Ethernet network; wide-area networks, such as the Internet; and virtual networks, such as a virtual private network.

The system 1200 is one example for executing a data analysis software according to an embodiment of the invention. In another embodiment, web application server 1230, web server 1225, and optionally database 1235 can be combined into a single server computer system. In alternate embodiment, all or a portion of the web application functions may be integrated into an application running on each of the user computers. For example, a Java™ or JavaScript™ application on the user computer is used to retrieve or analyze data and display portions of the data analysis application.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for capturing information for activity in a database, the database including one or more sessions that may or may not be active over a period of time, the method comprising:

determining a plurality of times to sample the database;

at each of the each plurality of times, performing the steps of:

determining one or more active sessions from the one or more sessions included in the database that are active at the time, the one or more active sessions associated with operations being performed in the database at the time of sampling;

capturing information for activity in the database at the time sampling for each of the one or more active sessions; and storing the captured information for each of the active sessions to generate a snapshot of activity in the database for each of the active sessions.

2. The method of claim 1, wherein capturing information comprises capturing the information using an internal process in the database.

3. The method of claim 1, wherein at different times in the plurality of times, the determined one or more active sessions include different sessions.

4. The method of claim 1, wherein at least a part of the stored capturing information for a session provides a session history.

5. The method of claim 1, wherein capturing information for each of the one or more active sessions is performed without using SQL.

6. The method of claim 1, wherein the captured information includes at least one of a username, a request syntax, and information on what activity the session is performing at the time.

7. The method of claim 1, wherein storing the captured information comprises storing the information storing the information in at least one of temporary storage and archival storage.

8. The method of claim 1, further comprising creating a view from the captured information, the viewing indicating database activity.

9. The method of claim 1, wherein the plurality of times includes times in a periodic interval.

10. The method of claim 1, further comprising:

filtering the captured information based on which information is desired; and archiving the captured information for a session if it is desired.

11. The method of claim 10, wherein filtering the captured information comprises filtering the captured information based on a time the captured information was captured.

12. An apparatus for sampling database activity, the database including one or more sessions that may or may not be active over a period of time, the method comprising:

a session activity determiner configured to determine one or more active sessions of one or more sessions in the database at certain times over a time interval, wherein the one or more sessions may or may not be active over a period of time, and wherein the one or more active sessions are associated with operations being performed in the database at the certain times; and an activity sampler configured to capture samples of database activity for active sessions at the certain times, wherein the samples are captured by recording a sequence of snapshots of information for activity in the database for one or more active sessions over time.

13. The apparatus of claim 12, wherein the activity sampler is located in the database.

14. The apparatus of claim 12, further comprising a filter configured to filter the captured samples to determine which information in the captured sampled should be stored.

15. The apparatus of claim 12, wherein the activity sampler is configured to capture the samples of activity without using a query language.

16. The apparatus of claim 12, further comprising a storage device configured to store the captured samples of activity.

17. The apparatus of claim 16, further comprising a view creator configured to create a view of database activity from the information stored in the storage device.

18. The apparatus of claim 16, wherein the storage device comprises a temporary storage.

19. The apparatus of claim 18, further comprising archival storage configured to store information that is older than information stored in temporary storage.

20. A method for capturing session activity in a database, the database including one or more sessions that may or may not be active over a period of time, the method comprising:
    determining one or more active sessions from the one or more sessions in the database at certain times over a time interval, wherein the one or more active sessions are associated with operations being performed in the database at the certain times; and
    capturing samples of database activity for active sessions at the certain times, wherein the samples are captured by recording a sequence of snapshots of information for activity in the database for one or more active sessions over time.

21. The method of claim 20, wherein capturing samples of activity is performed without using SQL.

22. The method of claim 20, wherein capturing samples of activity comprises capturing the samples of activity using an internal process in the database.

23. The method of claim 20, further comprising storing the samples of activity.

24. The method of claim 23, wherein storing the samples comprises storing the samples in at least one of temporary storage and archival storage.

25. The method of claim 23, wherein information in temporary storage has been captured more recently than information in the archival storage.

26. The method of claim 23, further comprising filtering information in the temporary storage to determine if the information should be stored in the archival storage.

27. The method of claim 23, further comprising creating a view from the stored information indicating database activity over a period of time.

28. A computer program product storing instructions on a computer-readable medium for a computer system having a processor configured to execute the instructions to perform operations for capturing information for activity in a database, the database including one or more sessions that may or may not be active over a period of time, the computer program product comprising:
    code for determining a plurality of times to sample the database;
    code for, at each of the each plurality of times, performing the steps of:
        determining one or more active sessions from the one or more sessions included in the database that are active at the time, the one or more active sessions associated with operations performed in the database at the time of sampling;
        capturing information for each of the one or more active sessions for activity in the database at the time of sampling; and
        storing the captured information for each of the active sessions to generate a snapshot of activity in the database for each of the active sessions.

29. The computer program product of claim 28, wherein the code for performing the step of capturing information comprises code for capturing the information using an internal process in the database.

30. The computer program product of claim 28, wherein at different times in the plurality of times, the determined one or more active sessions include different sessions.

31. The computer program product of claim 28, wherein the code for performing the step of capturing information for each of the one or more active sessions includes code for capturing the information without using SQL.

32. A computer program product storing instructions on a computer-readable medium for a computer system having a processor configured to execute the instructions to perform operations for capturing session activity in a database, the database including one or more sessions that may or may not be active over a period of time, the computer program product comprising:
    code for determining one or more active sessions from the one or more sessions in the database at certain times over a time interval, the one or more active sessions associated with operations performed in the database at the certain times; and
    code for capturing samples of database activity for active sessions at the certain times, wherein the samples are captured by recording a sequence of snapshots of information for activity in the database at the time of sampling for one or more active sessions over time.

33. The computer program product of claim 32, wherein the code for capturing samples of activity includes code for capturing the information without using SQL.

34. The computer program product of claim 32, wherein the code for capturing samples of activity comprises code for capturing the samples of activity using an internal process in the database.

* * * * *

UNITED STATES PATENT AND TRADEMARK OFFICE
CERTIFICATE OF CORRECTION

| | | |
|---|---|---|
| PATENT NO. | : 7,292,961 B2 | |
| APPLICATION NO. | : 10/775733 | |
| DATED | : November 6, 2007 | |
| INVENTOR(S) | : Dias et al. | |

It is certified that error appears in the above-identified patent and that said Letters Patent is hereby corrected as shown below:

On page 2, under "Other Publications", in column 2, line 8, delete "Systems,"" and insert -- System," --, therefor.

On sheet 4 of 6, in Fig. 4, (in the Table on Left Hand Side), on line 3, delete "inmemory" and insert -- in-memory --, therefor.

In column 1, line 13, delete "expired," and insert -- expired (Attorney Docket No.: 021756-003701US), --, therefor.

In column 1, line 19, delete "ARCHITECTURE";" and insert -- ARCHITECTURE", Attorney Docket No. 021756-003700US; --, therefor.

In column 1, line 22, delete "MODEL"." and insert -- MODEL", Attorney Docket No. 021756-004000US. --, therefor.

In column 3, line 29, delete "10/775,513," and insert -- 10/775,531, Attorney Docket No. 021756-003700US, --, therefor.

UNITED STATES PATENT AND TRADEMARK OFFICE
CERTIFICATE OF CORRECTION

PATENT NO. : 7,292,961 B2
APPLICATION NO. : 10/775733
DATED : November 6, 2007
INVENTOR(S) : Dias et al.

It is certified that error appears in the above-identified patent and that said Letters Patent is hereby corrected as shown below:

In column 3, line 31, after "10/775,513," insert -- Attorney Docket No. 021756-004000US, --.

Signed and Sealed this

Twenty-third Day of September, 2008

JON W. DUDAS
*Director of the United States Patent and Trademark Office*